US007548809B2

(12) United States Patent
Westerhoff

(10) Patent No.: US 7,548,809 B2
(45) Date of Patent: Jun. 16, 2009

(54) APPARATUS FOR CONTROLLING AND SENSING MOISTURE ON A MOVABLE CLOSURE MEMBER, MORE PARTICULARLY AN ELECTRICALLY POWERED AUTOMOTIVE WINDOW PANE

(75) Inventor: Ing. Bernd Westerhoff, Lindau (DE)

(73) Assignee: Metzeler Automotive Profile Systems GmbH, Lindau/Bodensee (DE)

( * ) Notice: Subject to any disclaimer, the term of this patent is extended or adjusted under 35 U.S.C. 154(b) by 830 days.

(21) Appl. No.: 11/037,639

(22) Filed: Jan. 18, 2005

(65) Prior Publication Data

US 2005/0187689 A1 Aug. 25, 2005

(30) Foreign Application Priority Data

Jan. 16, 2004 (DE) ....................... 10 2004 002 415

(51) Int. Cl.
*G06F 7/00* (2006.01)
*E05F 15/00* (2006.01)

(52) U.S. Cl. ........................... 701/49; 701/36; 340/562; 318/469; 318/453; 73/780; 73/774; 324/688

(58) Field of Classification Search ................. 324/671, 324/663, 688; 361/302; 340/562; 701/49, 701/36; 451/121; 277/317; 318/466, 468, 318/469, 453; 49/28; 73/780, 774
See application file for complete search history.

(56) References Cited

U.S. PATENT DOCUMENTS 4,887,024 A * 12/1989 Sugiyama et al. ........... 324/674
6,337,549 B1 * 1/2002 Bledin ........................ 318/466
6,377,009 B1 * 4/2002 Philipp ....................... 318/468
6,700,393 B2 * 3/2004 Haag et al. .................. 324/674

(Continued)

FOREIGN PATENT DOCUMENTS

DE 102 26 133 * 12/2002

(Continued)

OTHER PUBLICATIONS

Baxter, Larry, Capacitive Sensors Design and Applications (pp. 236-242 & 271-277) IEEE Press Marketing; 1997 by the Institute of Electrical and Electronics Engineers, Inc.*

(Continued)

*Primary Examiner*—Cuong H Nguyen
(74) *Attorney, Agent, or Firm*—Stephen B. Salai, Esq.; Brian B. Shaw, Esq.; Harter Secrest & Emery LLP

(57) ABSTRACT

An apparatus for controlling and sensing a closure member (20) movable between an open position and a closed position, more particularly an electrically powered window pane (20) of a motor vehicle (10) is provided with a sensor. The sensor comprises a sensor electrode (40) generating an electric field (F) in an opening range of the closure member (20) and a controller (22) connected to the sensor which senses any change in capacitance of the sensor electrode (40) in providing a control signal. For detecting a film of moisture (23) formed by condensation on the closing member (20) by simple and relatively low-cost means, the controller (22) detects a change in capacitance of the sensor electrode (40) caused by the presence of a film of moisture (23) on the closure member (20).

11 Claims, 2 Drawing Sheets

U.S. PATENT DOCUMENTS

| | | | | |
|---|---|---|---|---|
| 6,723,933 | B2 * | 4/2004 | Haag et al. | 200/61.42 |
| 6,750,624 | B2 * | 6/2004 | Haag et al. | 318/467 |
| 6,777,958 | B2 * | 8/2004 | Haag et al. | 324/674 |
| 6,936,986 | B2 * | 8/2005 | Nuber | 318/445 |
| 6,972,575 | B2 * | 12/2005 | Lambert et al. | 324/658 |
| 7,015,666 | B2 * | 3/2006 | Staus | 318/286 |
| 7,046,129 | B2 * | 5/2006 | Regnet et al. | 340/438 |
| 7,342,373 | B2 * | 3/2008 | Newman et al. | 318/466 |
| 7,449,852 | B2 * | 11/2008 | Washeleski et al. | 318/280 |
| 2002/0154039 | A1 * | 10/2002 | Lambert et al. | 341/33 |
| 2003/0071639 | A1 * | 4/2003 | Haag et al. | 324/674 |
| 2003/0071640 | A1 * | 4/2003 | Haag et al. | 324/674 |
| 2003/0071727 | A1 * | 4/2003 | Haag et al. | 340/562 |
| 2003/0081369 | A1 * | 5/2003 | Haag et al. | 361/302 |
| 2003/0085679 | A1 * | 5/2003 | Bledin et al. | 318/264 |
| 2003/0233183 | A1 * | 12/2003 | Nuber | 701/49 |
| 2003/0233790 | A1 * | 12/2003 | Nuber | 49/28 |
| 2004/0017171 | A1 * | 1/2004 | Staus | 318/469 |
| 2004/0172879 | A1 * | 9/2004 | Regnet et al. | 49/26 |
| 2005/0187689 | A1 * | 8/2005 | Westerhoff | 701/49 |
| 2006/0117862 | A1 * | 6/2006 | Shank et al. | 73/780 |

FOREIGN PATENT DOCUMENTS

| | | | | |
|---|---|---|---|---|
| DE | 10220725 | C1 | * | 4/2003 |
| DE | 50303774 | G | * | 7/2006 |
| DE | 102004002415 | B4 | * | 7/2008 |
| EP | 1449225 | A2 | * | 8/2004 |
| EP | 1555373 | A2 | * | 7/2005 |
| GB | 2319 294 | A | | 5/1998 |
| KR | 2005035167 | A | * | 4/2005 |
| WO | WO 03034315 | A2 | * | 4/2003 |

OTHER PUBLICATIONS

Benefits of wheel-tool gap sensing in Conform™ extrusion machinery; Khawaja, K.; Seneviratne, L.; Clode, M.P.; Mechatronics, IEEE/ASME Transactions on; vol. 10, Issue 4, Aug. 2005 pp. 428-436; Digital Object Identifier 10.1109/TMECH.2005.852486.*

Contamination-insensitive differential capacitive pressure sensors; Chuan Che Wang; Gogoi, B.P.; Monk, D.J.; Mastrangelo, C.H.; Microelectromechanical Systems, Journal of; vol. 9, Issue 4, Dec. 2000 pp. 538-543; Digital Object Identifier 10.1109/84.896776.*

Influence of Controller Parameters on Time Delay in Triggered Vacuum Switch; Wang, L.; He, Z. H.; Deng, H. M.; High Voltage Engineering and Application, 2008. ICHVE 2008. International Conference on; Nov. 9-12, 2008 pp. 344-347; Digital Object Identifier 10.1109/ICHVE.2008.4773943.*

Capacitive touch sensor based user-interface : Generic design considerations and development of an wearable input device Chatterjee, R.; Matsuno, F.; SICE Annual Conference, 2008; Aug. 20-22, 2008 pp. 2299-2303; Digital Object Identifier 10.1109/SICE.2008.4655048.*

Design and fabrication of a MEMS-based multi-sensorDuk-Soo Eun; Dae-Young Kong; Hyun-Jun Yoo; Young-Myong Hong; Jong-Min Jang; Tae-Wook Kang; In-SikYu; Jong-Hyun Lee; Nano/Micro Engineered and Molecular Systems, 2008. NEMS 2008. 3rd IEEE International Conference on,Jan. 6-9, 2008 pp. 588-591;Digital Object Identifier 10.1109/NEMS.2008.44844.*

Zhenhai Chen; Luo, R.C. , "Design and implementation of capacitive proximity sensor using microelectromechanical systems technology," Industrial Electronics, IEEE Transactions on; vol. 45, Issue 6, pp. 886-894, 1998.*

* cited by examiner

APPARATUS FOR CONTROLLING AND SENSING MOISTURE ON A MOVABLE CLOSURE MEMBER, MORE PARTICULARLY AN ELECTRICALLY POWERED AUTOMOTIVE WINDOW PANE

FIELD OF THE INVENTION

The invention relates to an apparatus for controlling and sensing a closure member movable between an open position and a closed position, more particularly an electrically powered automotive window pane. The apparatus is provided with a sensor comprising a sensor electrode generating an electric field in an opening range of the closure member. Moreover the apparatus comprises a controller connected to the sensor which senses any change in capacitance of the sensor electrode in providing a control signal.

BACKGROUND ART

One such apparatus usually finds application as a guard in preventing, for example, part of the human body becoming trapped between the closure member and a frame enclosing the closure member at least in part. The way in which such a capacitive anti-trap guard works is based on how the electric field is influenced by an electrically conductive obstruction in the opening range of the closure member which can be sensed as a change in capacitance of the sensor electrode. Unlike a so-called tactile anti-trap guard requiring physical contact of the obstruction with a sensor, the presence of an obstruction in the opening range of the closure member with a capacitive anti-trap guard is sensed without contact.

A capacitive anti-trap guard or trap protector is described in EP 1 154 110 A2. This known anti-trap guard comprises two electrical conductors which generate the electric field in the opening range of a closure member. One of these two conductors, the sensor electrode, is integrated in a weatherseal sealing the closure member and receives a predefined electric charge. It is in this way that a reference capacitance can be defined between the sensor electrode and the other conductor, the base electrode, which, for example, is grounded. The change in capacitance of the sensor electrode relative to the reference capacitance because of the presence of an obstruction in the opening range of the closure member is detected by means of a controller which furnishes a control signal for a motor powering the closure member. To permit detecting a non-conductive material, such as wood or plastics, for example, prompting no or merely an insignificant change in capacitance, the anti-trap guard is provided with a so-called soft-spot. The soft-spot is achieved by making the portion of the weatherseal accommodating the sensor electrode deformable. In this way there is a change in the relative position of the sensor electrode and base electrode when the obstruction comes into contact physically with the weatherseal and thus a change in capacitance. The known anti-trap guard (trap protector) is characterized by an active redundance which effectively prevents the obstruction being trapped irrespective of its material.

A capacitive anti-trap guard or trap protector is furthermore described in DE 694 13 170 T2. This anti-trap guard comprises a control unit that includes an oscillator generating a signal. At a closed window pane, the signal is dependent on the surrounding conditions close to the window pane, like temperature and moisture for example. For this reason the anti-trap guard comprises a compensation switch compensating for the surrounding conditions in order to create an independent control signal.

Known furthermore are capacitive sensors which find application in determining the relative moisture content. By absorbing water the capacitance of such a capacitor made for example of a thin film of polymer metallized on both sides, is reversibly changed. Such moisture sensors thus often find application in sensing air quality, air-conditioning control or in a demister.

A capacitive moisture sensor which is put to use for detecting moisture on the windshield of a motor vehicle is described in EP 0 753 438 B1. The moisture sensor comprises a glass laminate and at least three non-grounded electrodes arranged on an inner surface of the glass laminate. The electrodes form two sensing portions on an outer surface of the glass laminate. The difference in the amount of moisture sensed in the two sensing portions is used as a reference for outputting a signal. In addition to the electrodes a shielding electrode may be provided which directs the sensitivity of the electrodes at the outer surface of the glass laminate. The drawback in this known moisture sensor has proven to be that the electrodes are directly mounted on the glass laminate, resulting in relatively complicated and cost-intensive fabrication. Apart from this, the moisture sensor can only be used on dead window panes, such as the windshield or rear window of a motor vehicle. For powered window panes as is often the case with side windows of a motor vehicle, the known moisture sensor is unsuitable since the electrodes secured to the window pane are included in the movement in thus altering the sensing portion.

BRIEF SUMMARY OF THE INVENTION

The invention is based on the object of improving an apparatus of the kind as described at the outset so that misting formed by condensation on the closure member can now be detected by simple and relatively low-cost means.

To achieve this object it is provided for in an apparatus having the features as cited above in accordance with the invention as it reads from claim 1 that the controller senses a change in capacitance in the sensor electrode on the basis of the presence of a film of moisture on the closure member.

The invention makes use of having discovered how to use a capacitive sensor as the moisture sensor which can now be put to use simply and at relatively low cost even on powered closure members. This is especially due to the fact that the sensor electrode generating the electric field in the opening range of the closure member is located stationary, for example on a weatherseal sealing the closure member, extending along a frame enclosing the closure member at least in part. Any misting forming due to condensation on the closure member alters the permittivity of the dielectric in which the electric field is generated and as a result can thus be sensed as a change in capacitance in the sensor electrode. The control signal furnished by the controller can be applied, for example, to an air-conditioning system which then demists the closure member by correspondingly regulating the temperature, flow and distribution of air. When the closure member is a window pane, for instance, this solution makes for a clear view.

Advantageous aspects of the apparatus in accordance with the invention read as the subject matter of claims 2 to 12.

In one preferred aspect of the apparatus in accordance with the invention the sensor can be operated in a first sensitivity mode and in a second preferably higher sensitivity mode, the controller detecting in the first sensitivity mode a change in capacitance of the sensor electrode due to the presence of an obstruction in the opening range of the closure member. Furthermore, the controller detects in the second sensitivity mode a change in capacitance of the sensor electrode due to the presence of a film of moisture on the closure member.

Such a configuration is based on having discovered how to make use of a capacitive sensor both as a moisture sensor and as an anti-trap guard. This combined use of the capacitive sensor is made possible by the different sensitivity modes preventing the control signals furnished by the controller from influencing each other. When the sensor is operated in the first sensitivity mode, the sensitivity of the sensor is set so that the change in capacitance of the sensor electrode is due to the presence of an obstruction in the opening range of the closure member, whereas when the sensor is in the second sensitivity mode, the sensitivity of the sensor is such that a film of moisture on the closure member results in a change in capacitance of the sensor electrode.

It is additionally of advantage when the controller in the first sensitivity mode furnishes a control signal for a motor powering the closure member, so that when an obstruction exists in the opening range of the closure member the movement of the closure member can be halted or reversed.

It is further of advantage when the controller in the second sensitivity mode furnishes a control signal for an air-conditioning system. The air-conditioning system often including a closed loop is able to regulate the temperature, flow and distribution of air in, for instance, the interior of a motor vehicle for demisting the closure member, for example a window pane.

In another preferred aspect of the apparatus in accordance with the invention the sensor is operated in the open position of the closure member in the first sensitivity mode and in the closed position of the closure member in the second sensitivity mode. The closed position of the closure member is relatively simple to detect, for example, by means of proximity sensors, and permits in addition, precise and reproducible switching from the first sensitivity mode to the second sensitivity mode.

In yet another preferred aspect of the apparatus in accordance with the invention a weatherseal sealing the closure member is provided manufactured of an elastically deformable material, preferably an elastomer and secured to a frame enclosing the closure member at least in part. The sensor electrode is in this case preferably arranged in the portion of weatherseal so that propagation of the electric field generated by the sensor electrode materializes in the full opening range of the closure member.

The sensor electrode may be arranged, for example, on a trim item. Preferably, however, the sensor electrode is integrated in the weatherseal to ensure uncomplicated handling in practice. In this arrangement the sensor electrode is configured to advantage either as a strip of metal embedded in the weatherseal or as an electrically conductive portion of the weatherseal.

Preferably the weatherseal comprises at least one sealing lip contacting the closure member, and at least one holding lip positively and/or non-positively connected to the frame. The sealing lip helps in effectively sealing the closure member, whereas the holding lip ensures reliable securing of the weatherseal in the frame.

To generate the electric field in the opening range of the closure member, the sensor preferably comprises a base electrode preferably formed by the frame which in this case is expediently grounded.

BRIEF DESCRIPTION OF THE DRAWINGS

Details and further advantages of the apparatus in accordance with the invention read from the following description of a preferred example embodiment. In the drawings representing the example embodiment merely diagrammatically

DETAILED DESCRIPTION OF THE INVENTION

Figure 1:
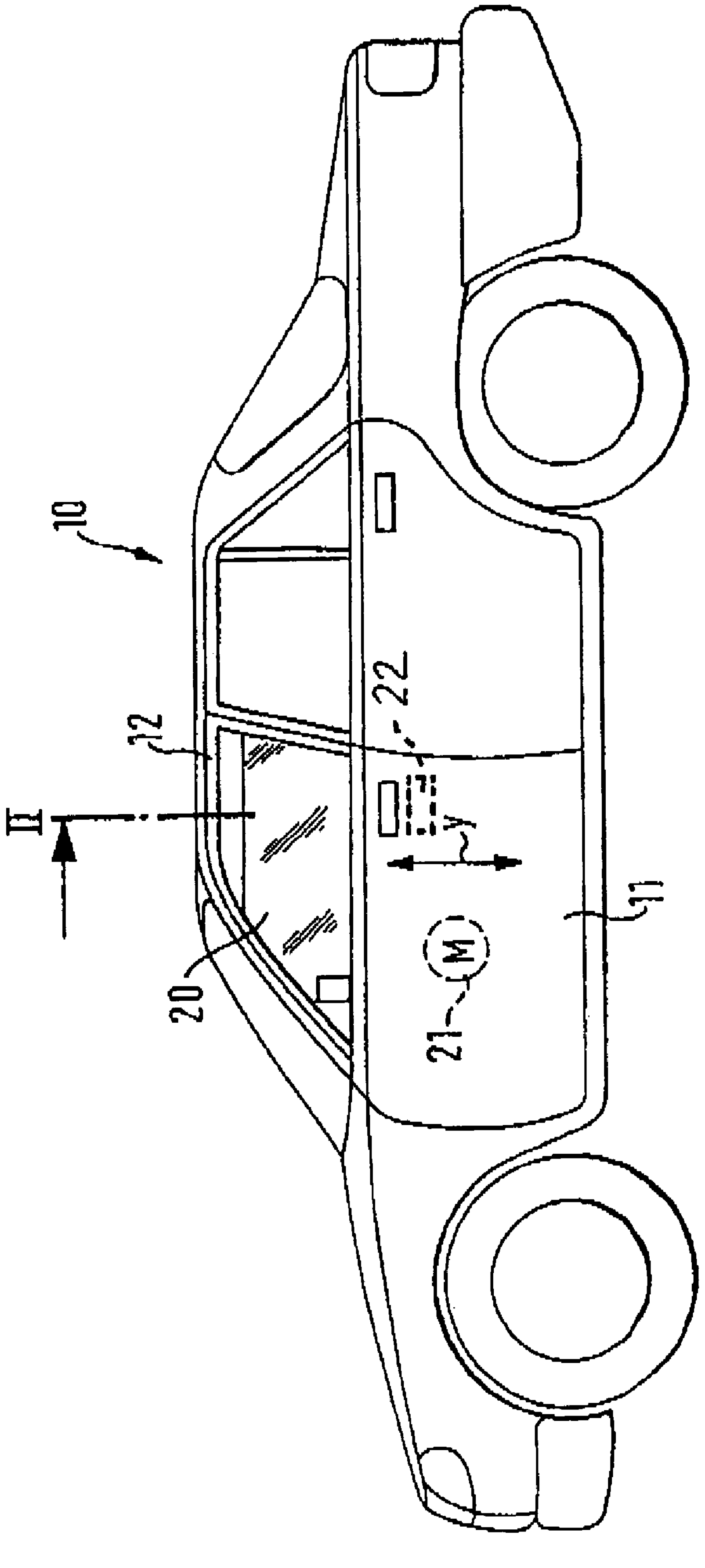
FIG. 1 is a side view of a motor vehicle and FIG. 2 is a section taken along the line II in FIG. 1.

Referring now to FIG. 1 there is illustrated the motor vehicle 10 provided in the region of a door 11 with a window pane 20 powered by an electric motor 21. The window pane 20 representing a closure member is movable in a direction of movement y between an open position and a closed position.

Figure 2:
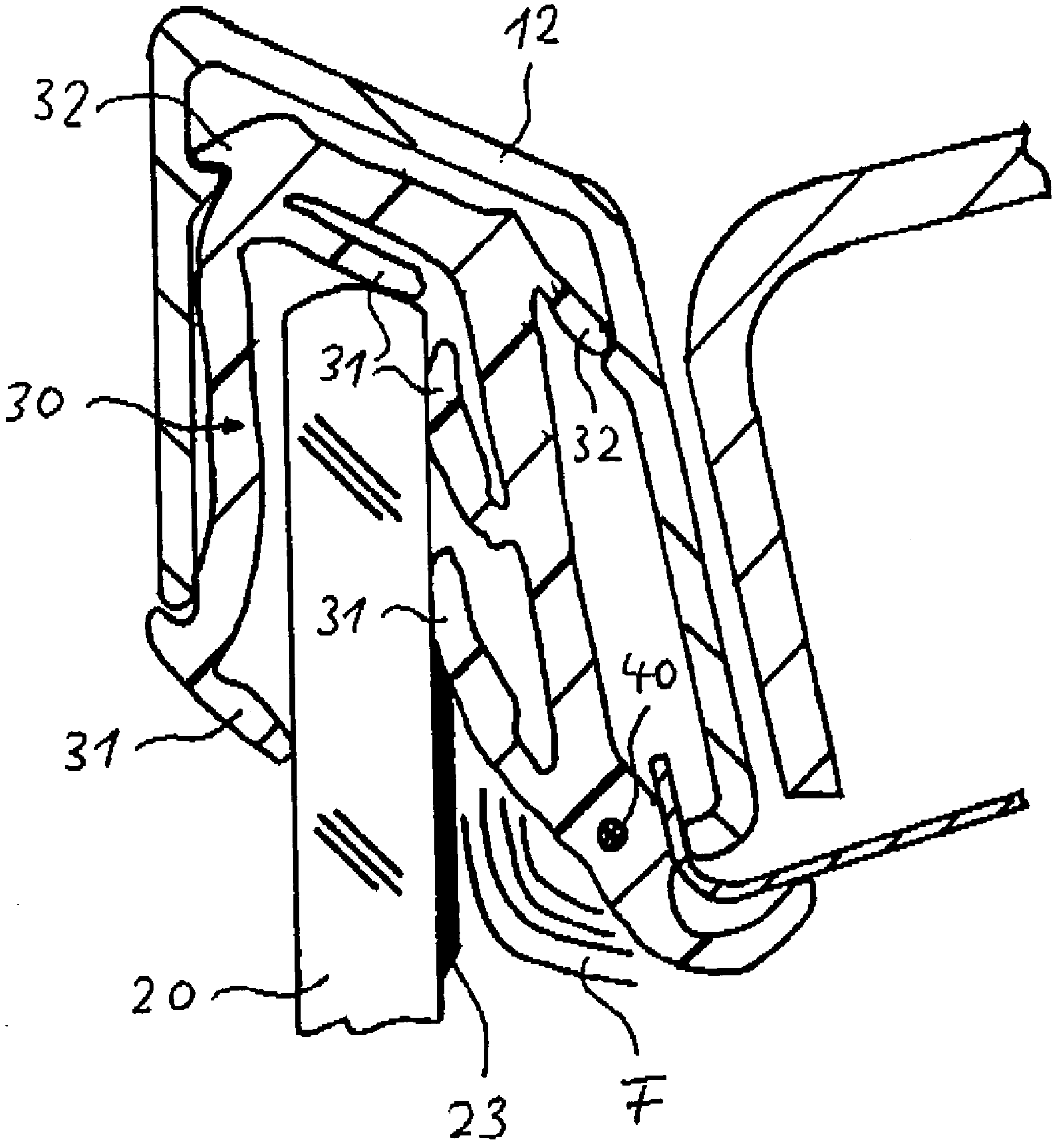

Referring now to FIG. 2 there is illustrated how the door 11 comprises a frame 12 on which a weatherseal 30 sealing the window pane 20 is arranged. The weatherseal 30 made of a non-electrically conductive elastomer, for example, ethylene propylene diene monomer (EPDM) is provided with sealing lips 31 which guide and seal the window pane 20. In addition, the weatherseal 30 features holding lips 32 ensuring reliable securement of the weatherseal 30 to the frame 12.

Further evident from FIG. 2 is how a sensor electrode 40 configured as a strip of metal is embedded in the weatherseal 30. As an alternative the sensor electrode 40 may be formed by an electrically conductive portion of the weatherseal 30 which can be produced, for example, by coextrusion.

The sensor electrode 40 is a component of a sensor and serves together with a base electrode formed by the grounded frame 12 to generate an electric field F in the opening range of the window pane 20, The sensor is connected to a controller 22 which detects any change in capacitance of the sensor electrode 40 and furnishes a control signal. The controller 22 may be a separate module or component of an electric control circuit of the electric motor 21.

The sensor can be operated in a first sensitivity mode and in a second preferably higher sensitivity mode. In the first sensitivity mode the controller 22 detects any change in capacitance of the sensor electrode 40 caused by the presence of an obstruction in the opening range of the window pane 20. In this case the controller 22 furnishes a control signal for the electric motor 21 powering the window pane 20. The control signal halts the electric motor 21 or results in reversal of the movement of the window pane 20 in preventing the obstruction from being trapped between the window pane 20 and the frame 12.

When the sensor is operated in the second sensitivity mode, however, the controller 22 senses a change in capacitance of the sensor electrode 40 caused by a film of moisture 23 on the window pane 20. The film of moisture 23 apparent as misting of the window pane 20 alters the permittivity of the dielectric in which the electric field F is generated thus making itself evident as a change in capacitance of the sensor electrode 40. In the second sensitivity mode the controller 22 furnishes a control signal for an air-conditioning system making it possible to demist the window pane 20 by removing the film of moisture 23 by regulating the temperature, flow and distribution of air, in thus assuring a clear view through the window pane 20.

The change from the first sensitivity mode to the second sensitivity mode is preferably done in the closed position of the window pane 20. The sensor is operated in the open position of the window pane 20 in the first sensitivity mode and in the closed position of the window pane 20 in the second sensitivity mode, When the window pane 20 is open a capacitive anti-trap guard is thus provided, whereas in the closed position of the window pane 20 the sensor represents a moisture sensor. As an alternative it is also possible to operate the sensor exclusively in the second sensitivity mode. In this case the sensor functions as a moisture sensor in both the closed position and open position of the window pane 20.

The apparatus as described above for controlling and sensing the movable window pane 20 in the door 11 is characterized by a sensor which now makes it possible to detect a film of moisture 23 formed by condensation on the window pane 20 by simple and relatively low-cost means. In addition, the apparatus is characterized by the combined employment of the sensor not only as a moisture sensor but also as an anti-trap guard by reason of the different sensitivity modes for functioning, on the one hand, as a moisture sensor and, on the other as an anti-trap guard. It is these different sensitivity modes that ensure there is no mutual interference between the control signals provided by the controller 22 in thus eliminating a malfunction. Lastly, but by no means least, it is this combined use of the sensor as a moisture sensor and as an anti-trap guard that satisfies the requirements pertinent to automotive design for a simple and relatively low-cost solution.

What is claimed is:

1. An apparatus for controlling and sensing a closure member movable between an open position and a closed position, more particularly an electrically powered window pane in a motor vehicle, comprising:

a sensor having a sensor electrode generating an electric field in an opening range of the closure member and a controller connected to the sensor and detecting any change in capacitance of the sensor electrode in providing a control signal, the controller detecting a change in capacitance of the sensor electrode on the basis of the presence of film of moisture on the closure member;

wherein the sensor is operable in a first sensitivity mode and in a second sensitivity mode;

wherein the controller detecting in the first sensitivity mode a change in capacitance of the sensor electrode due to the presence of an obstruction in the opening range of the closure member; and wherein the controller detecting in the second sensitivity mode a change in capacitance of the sensor electrode due to the presence of a film of moisture on the closure member.

2. The apparatus as set forth in claim 1 wherein the sensor includes a base electrode formed by the frame.

3. The apparatus as set forth in claim 1, wherein the controller furnishes in the first sensitivity mode a control signal for an electric motor powering the closure member.

4. The apparatus as set forth in claim 1, wherein the controller furnishes in the second sensitivity mode a control signal for an air-conditioning system.

5. The apparatus as set forth in claim 1, wherein the sensor is operated in the open position of the closure member in the first sensitivity mode and in the closed position of the closure member in the second sensitivity mode.

6. The apparatus as set forth in claim 1 comprising a weatherseal sealing the closing member and made of an elastically deformable material, preferably an elastomer secured to a frame enclosing the closure member at least in part.

7. The apparatus as set forth in claim 1, wherein the sensor electrode is arranged in the region of the weatherseal.

8. The apparatus as set forth in claim 7, wherein the sensor electrode is integrated in the weatherseal.

9. The apparatus as set forth in claim 8, wherein the sensor electrode is configured as a metal strip embedded in the weatherseal.

10. The apparatus as set forth in claim 8, wherein the sensor electrode is configured as an electrically conductive portion of the weatherseal.

11. The apparatus as set forth in claim 6, wherein the weatherseal comprises at least one sealing lip contacting the closure member and at least one holding lip positively and/or nonpositively connected to the frame.

* * * * *